(12) United States Patent
Vasilescu

(10) Patent No.: US 7,138,735 B2
(45) Date of Patent: Nov. 21, 2006

(54) INTERNAL VENTILLATING SYSTEM FOR A ROTATING ELECTRICAL MACHINE SUCH AS A MOTOR VEHICLE ALTERNATOR

(75) Inventor: Claudiu Vasilescu, Paris (FR)

(73) Assignee: Valeo Equipements Electriques Moteur, Creteil (FR)

( * ) Notice: Subject to any disclaimer, the term of this patent is extended or adjusted under 35 U.S.C. 154(b) by 0 days.

(21) Appl. No.: 10/518,674

(22) PCT Filed: Jun. 30, 2003

(86) PCT No.: PCT/FR03/02023

§ 371 (c)(1),
(2), (4) Date: Aug. 29, 2005

(87) PCT Pub. No.: WO2004/004096

PCT Pub. Date: Jan. 8, 2004

(65) Prior Publication Data

US 2006/0012253 A1    Jan. 19, 2006

(30) Foreign Application Priority Data

Jun. 28, 2002 (FR) .................................. 02 08134

(51) Int. Cl.
*H02K 9/00* (2006.01)
*H02K 5/00* (2006.01)

(52) U.S. Cl. ................ 310/58; 310/89; 310/60 A; 310/59; 310/62; 310/63

(58) Field of Classification Search ............... 310/89, 310/263, 58, 59, 60 R, 60 A, 62–63
See application file for complete search history.

(56) References Cited

U.S. PATENT DOCUMENTS 4,757,221 A * 7/1988 Kurihashi et al. ........... 310/62
5,021,696 A * 6/1991 Nelson ........................ 310/62
5,777,407 A * 7/1998 Ishida et al. ................. 310/64
6,078,116 A * 6/2000 Shiga et al. .............. 310/60 R (Continued)

FOREIGN PATENT DOCUMENTS

DE    3514207 A1    10/1986

(Continued)

OTHER PUBLICATIONS

International Search Report dated Feb. 12, 2004, 3 pages.

(Continued)

*Primary Examiner*—Tran Nguyen
(74) *Attorney, Agent, or Firm*—Osha Liang LLP

(57) ABSTRACT

The invention concerns a rotating electrical machine, comprising inside a housing, a fixedly mounted stator and a rotor rotatably mounted in the stator, the ventilating system including in particular at least one ventilator integral with the rotor and capable of generating a cooling air stream inside the housing, radial air intake orifices (20) arranged in the housing, and cooling air discharge ports (22) arranged in said housing in a ring opposite the periphery of the ventilator and mutually separated by fins (24) stiffening the housing in the port region. The system is characterized in that the angle of inclination of the fins (24) relative to the tangent perpendicular to the radial direction (R) ranges between 38° and 52°. The invention is for use for motor vehicle alternators.

8 Claims, 3 Drawing Sheets

U.S. PATENT DOCUMENTS

| | | | |
|---|---|---|---|
| 6,417,585 B1 * | 7/2002 | Oohashi et al. | 310/58 |
| 6,426,580 B1 * | 7/2002 | Ikeda et al. | 310/263 |
| 6,469,408 B1 * | 10/2002 | Asao | 310/62 |
| 6,617,717 B1 * | 9/2003 | Okawa | 310/59 |
| 6,844,638 B1 * | 1/2005 | Vasilescu | 310/62 |
| 6,888,275 B1 * | 5/2005 | Nakano | 310/89 |

FOREIGN PATENT DOCUMENTS

| | | |
|---|---|---|
| DE | 19829070 A1 | 1/2000 |
| EP | 1032112 A1 | 8/2000 |
| FR | 2602924 A3 | 2/1988 |
| FR | 2602925 A1 | 2/1988 |
| FR | 2745439 A1 | 8/1997 |
| FR | 2793964 A1 | 11/2000 |

OTHER PUBLICATIONS

English Patent Abstract of FR2602925 from esp@cenet, published Feb. 19, 1988, 1 page.

* cited by examiner

INTERNAL VENTILLATING SYSTEM FOR A ROTATING ELECTRICAL MACHINE SUCH AS A MOTOR VEHICLE ALTERNATOR

BACKGROUND OF INVENTION

1. Field of the Invention

The invention concerns an internal ventilating system for a rotating electrical machine of the type that includes, within a housing, a stator fixed-mounted in the housing and a rotor rotary-mounted in the stator; the ventilation system includes in particular at least one ventilator integrated with the rotor and capable of generating a cooling air stream within the housing, radial air intake orifices arranged in the housing and cooling air discharge ports arranged in said housing in a ring opposite the periphery of the ventilator and separated from each other by fins stiffening the housing in the area of the ports. The invention also concerns a rotating electrical machine that includes such a ventilation system.

2. Background Art

It has been shown that, to minimize the pressure losses caused by the fins and the noise due to the cooling fluid flows (air in this case), it is advantageous to incline them according to the direction of the air flow that must be discharged. The necessity to combine ventilator and housing is a serious disadvantage.

SUMMARY OF INVENTION

The purpose of this invention is to offer a ventilation system of the type described above, which reduces this disadvantage.

To achieve this purpose, the ventilation system in the invention is characterized in that the angle of inclination of the fins in relation to the tangent is between 38° and 52°.

Surprisingly, it has been demonstrated that such a range of angles is suitable for a large number of ventilator-housing combinations, while providing low pressure losses and a reduction in noise. Thus, for each ventilator-housing combination, we calculate the angle of inclination and propose a range.

According to one characteristics of the invention, it is advantageous to choose the angle at a value of 45°.

BRIEF DESCRIPTION OF DRAWINGS

The invention will be understood better, and other purposes, characteristics, details and advantages of the invention will appear more clearly in the explanatory description that follows, which refers to the attached schematic drawings that are provided only as an example illustrating one method for making the invention, in which.

DETAILED DESCRIPTION

Figure 1:
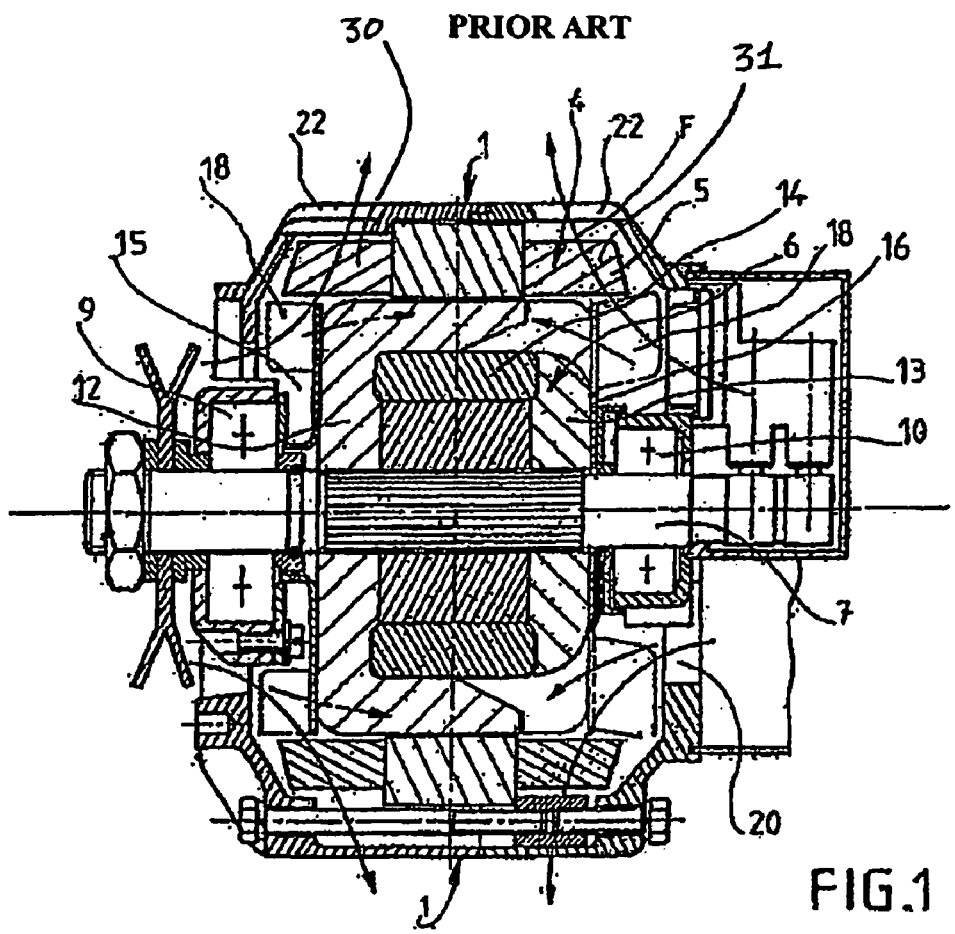
FIG. 1 is an axial cross section of an alternator according to the state of the art.

Referring to FIG. 1, we will first describe the general structure of a ventilation system for a rotating electrical machine, in this case an alternator for an automobile, to place the invention in its context. This type of alternator is described, for example, in document FR-A-2 602 925, to which we will refer for more explanations.

On this figure, reference 1 designates a perforated alternator housing in general rotating form, which coaxially surrounds a stator 4 equipped with windings 5 within which is rotary-mounted a rotor 6 of the type with prongs that includes a shaft 7 supported by the housing through front main bearing 9 and rear main bearing 10. The rotor is composed of two polar parts, the front one 12 and rear one 13, and a winding 14. Each polar part 12, 13 carries on its plate part a ventilator, a front ventilator 15 and rear ventilator 16. The ventilators are integrated in rotation with their respective support polar part. The stator 4 is carried in the inside by housing 1.

As shown schematically on the figure, each ventilator carries on its outside open face a number of ventilation blades 18.

Housing 1 is formed of two hollow parts called respectively front main bearing 19 and rear main bearing 21.

These main bearings are attached together, for example, with a screw 26 and each contains a part with a generally transversal orientation connected through a connection zone to a ring with an axial orientation. The main bearings carry in the center, toward their transversal part, the bearings 9, 10, and the front main bearing is adjacent to the drive pulley of the alternator, and the rear main bearing is adjacent to the rectifier bridge (not referenced) carried by the alternator.

The transversal sections of the main bearings are equipped with axial air intake orifices 20. The ring of the main bearings extends to the outside periphery of the bearings and carries the stator 4 on the inside more specifically, the body presented by the stator to carry the windings 5. This ring is equipped with orifices 22 called ports.

The ports 22 are axially oblong and also affect the external periphery of the transversal section of the main bearing in question. The ports 22 extend on either side of the body of the stator 4 and are located outside the projecting parts, called chignon, of the windings 5 and the ventilators. The ports 22 thus contain a section with an axial orientation, called the axial orifice, that only affects the ring of the main bearing.

Figure 3:
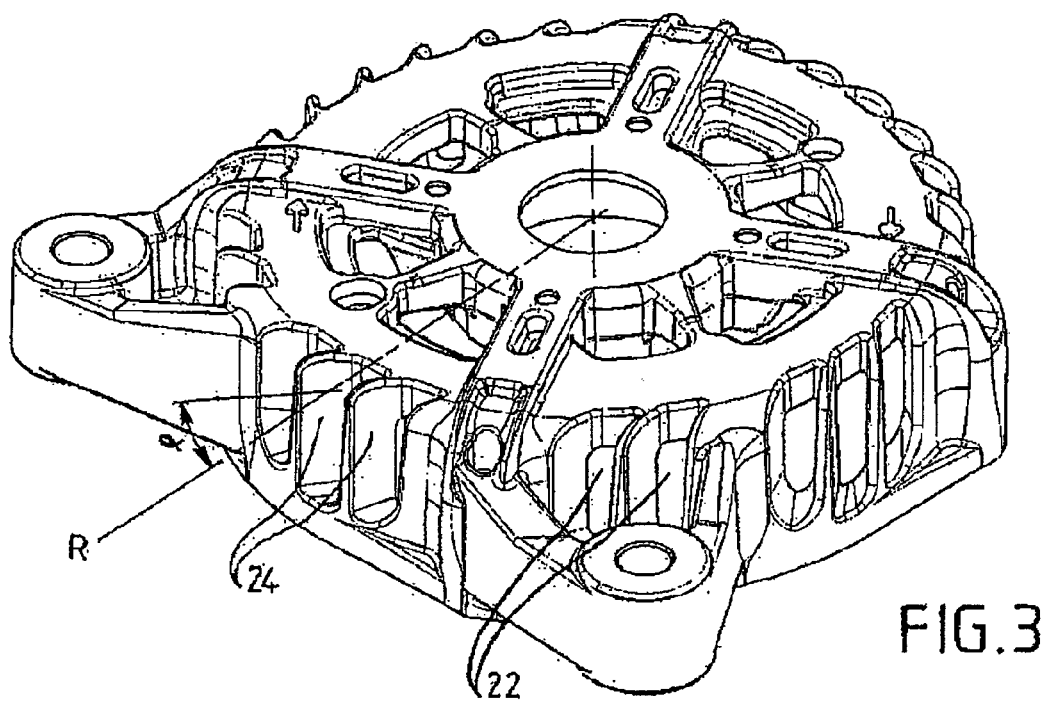
FIG. 3 is a perspective of a front main bearing equipped with ventilation ports according to the invention.

The axial orifices have an axial length equal to the height of a cylindrical portion of the ring delimited by a first circle corresponding to the bottom of the ports adjacent to the body of the stator and by another circle corresponding to the edge of the axial orifices of the ports. FIG. 3 shows a perspective of the ports 22 delimited by fins 24.

The ventilators are configured to create a cooling air flow, the components of which are indicated by arrows, sucking in ambient air through intake axial orifices 20. A portion of the cooling air indicated by arrow F is discharged through the ports 22.

The invention concerns the internal ventilation system that essentially includes a ventilator 15 or 16 and the ports 22 to discharge the air flow created by the ventilator and illustrated by arrow F.

Figure 2:
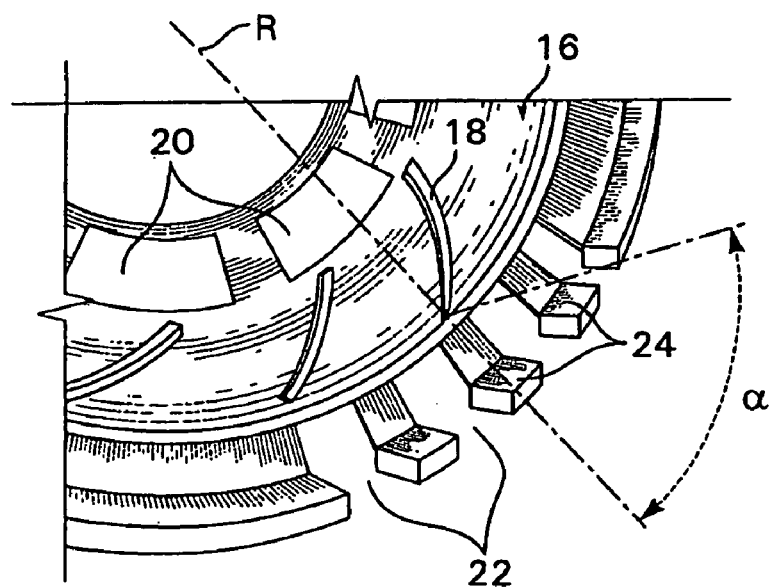
FIG. 2 is a simplified schematic view of a ventilation system according to the invention, showing a ventilator and cooling air discharge ports.

We will describe the invention below by referring to FIGS. 2 and 3. On these figures, as on FIG. 1, the ventilator is designated by 16, the ventilator blades by 18, and the ventilation ports by 22.

As we see on FIG. 3, on which the section of the housing that has the ports 22 is a front main bearing; the ports 22 are obtained by placing fins 24 in the appropriate orifices in the peripheral surface of the main bearing; the fins extend parallel to the axis of the alternator and are inclined in an angle predetermined in relation to the radial direction R. The function of the fins 24 is to mechanically stiffen the main bearing.

In accordance with the invention, the fins 24 present an angle of inclination of between 38° and 52°, and preferably 45° in relation to the tangent perpendicular to the radial direction. In other words, the angle of inclination in relation to the radial direction R is between (90°–38°) and (90°–52°).

Despite the general opinion that the fins must have an inclination that is substantially parallel to the direction of the cooling air flow that must be discharged through the ports, for each ventilator/housing or main bearing combination, to avoid significant pressure losses, it has been demonstrated that when inclinations in the range of 38° to 52° cited above are selected, good ventilator/main bearing compatibility is retained in a large number of such ventilator/main bearing combinations, with relatively low pressure losses and reduced air flows. Thus, the ventilation system is less noisy.

With respect to the fabrication of the ports 22 and the fins that separate them, it should be noted that the radial orifice factor of the ports must be at least 40% to the extent that an increase in the radial orifice surface significantly increases the cooling efficiency of the ventilators, i.e. particularly electronic components in the rear main bearing of the alternator and the windings.

In order to increase the performance of the ventilation system, we increase the circumference of the axial orifices of the ports 22 so that the surface of the axial orifices represents at least 40% of the surface of the aforementioned cylindrical section of the ring.

Figure 4:
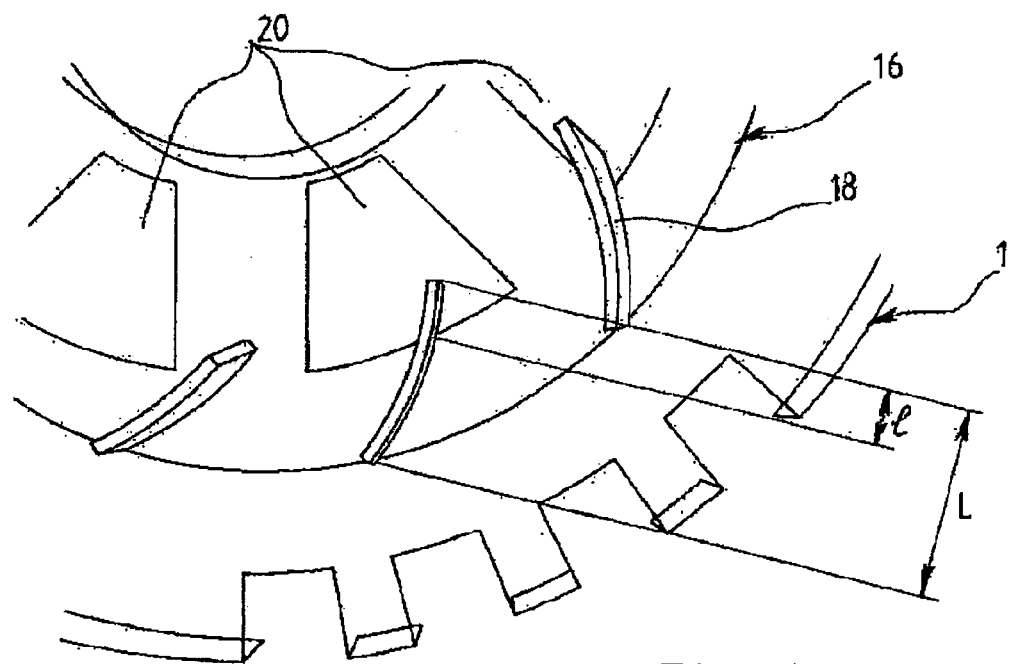
FIG. 4 illustrates another advantageous characteristic of the ventilation system according to the invention.

FIG. 4 shows another measurement that optimizes the cooling of the alternator. In effect, this figure illustrates that the ventilator blades should not overlap by more than a third, i.e., the distance 1 of their cord length L, the axial orifices as indicated in 20 on FIG. 1 of the housing or of the front or rear main bearings. In other terms, the outside diameter of the axial orifices must be chosen on the basis of the interior and exterior diameters of the ventilator.

It is advantageous, to obtain optimized ventilation, for the fins to be arranged so that they are angularly separated by a distance D=F.360°/N in which N=the number of notches of the stator, and F is a multiplier coefficient that is determined as a function of the mechanical configuration of the electrical machine, by serial calculation.

Thus, for example,
if N=36 notches, then 1.360°/36=10°. The fins are, thus, angularly separated by 10° or a multiple of 10°;
if N=48 notches, then 2.360°/48=15°. The fins are angularly separated by 7.5° or a multiple of 7.5°;
if N=96 notches, then 3.360°/96=11.25°. The fins are angularly separated by 3.75° or a multiple of 3.75°.

Figure 5:
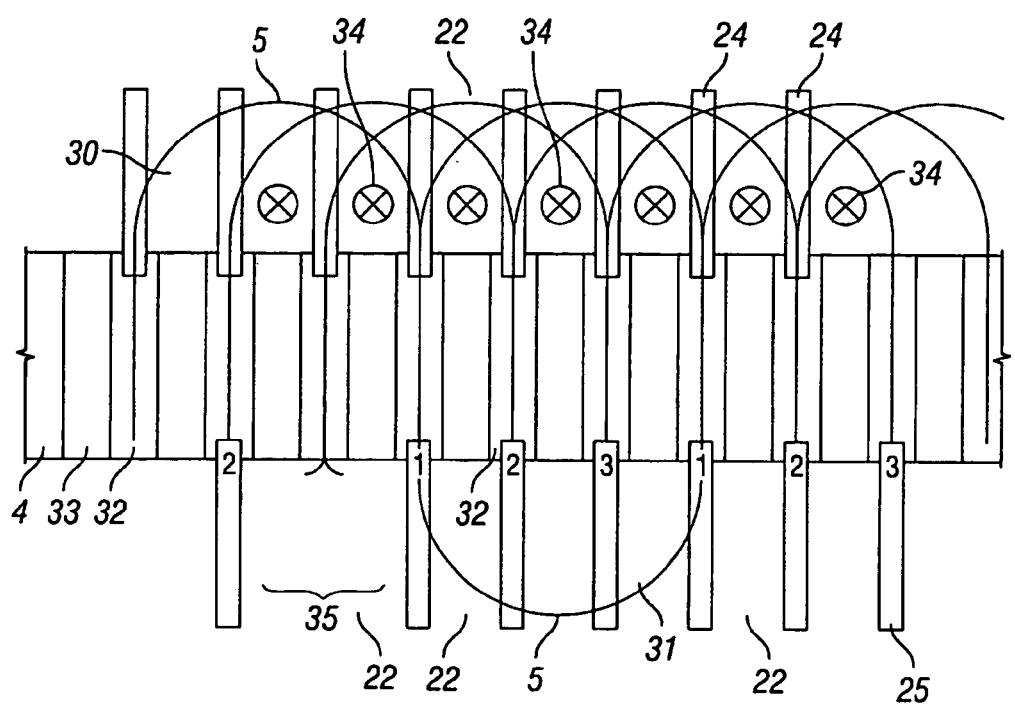
FIG. 5 is a radial view of the interior of a flat stator.

Thus, as shown on FIG. 5, this configuration obtains an optimized ventilation thanks to a reduction in load losses in front of the chignons of the winding 5 rolled in grooves 32 of the stator 4.

In effect, the winding density of the front chignon 30 and the rear chignon 31 (partially shown on FIG. 5 for reasons of clarity) which exit axially from the stator 4 present a maximum density above the grooves 32 and form an obstacle for the discharge of the air through the radial ports 22. Thus, according to the invention, the fins 24 are arranged to coincide angularly with these high density winding zones and not create additional obstacles in front of the air passages 34 above the teeth 33 of the stator. For this purpose, the fins 24 are radially aligned with the grooves 32 of the stator.

It is advantageous for the fins to be radially aligned on only a portion of all the grooves 32 of the stator. The pitch of the fins can be a multiple of the pitch of the grooves/teeth of the stator.

According to another method of fabrication, the fins can radially overlay the grooves 32 of the stator with a random pitch 35.

It is advantageous for at least 70% of the fins to be radially aligned with the grooves of the stator.

What is claimed is:

1. An internal ventilation system of a rotating electric machine having, within a housing, a fixed-mounted stator in the housing and a rotary-mounted rotor in the stator the ventilation system comprising:
   one ventilator integrated with the rotor which is capable of creating a cooling air stream within the housing,
   air intake axial orifices arranged in the housing, and
   cooling air discharge ports arranged in said housing in a ring with respect to the periphery of the ventilator and separated from each other by fins stiffening the housing in the area of the radial ports,
   wherein the angle of inclination of the fins in relation to the tangent perpendicular to the radial direction is between 38° and 52°,
   wherein the radial ports have an axial oriented section, called the axial orifice, that axially affects only the axial oriented ring and belongs to a cylindrical portion, and
   wherein the surface of the axial orifices represents at least 40% of the surface of the cylindrical section.

2. The ventilation system in accordance with claim 1, wherein the angle of inclination of the stiffening fins is 45%.

3. The ventilation system in accordance with claim 1, wherein the angular distance between the air discharge radial fins is equal to F.360°/N, where N is the number of notches present in the stator and F is a multiplier coefficient.

4. The ventilation system in accordance with claim 3, wherein the fins are radially aligned with the grooves of the stator.

5. The ventilation system in accordance with claim 3, wherein at least 70% of the fins are radially aligned with the grooves of the stator.

6. The ventilation system in accordance with claim 3, wherein the pitch of the fins is a multiple of the pitch of the grooves of the stator.

7. The ventilation system in accordance with claim 1, wherein the part of the cord length of the blades of a ventilator overlapping the axial orifices of the housing must be less than or equal to one third.

8. An alternator for a vehicle having a ventilation system in accordance with one of claims 1 to 7.

* * * * *